United States Patent [19]

Darnell

[11] Patent Number: 5,961,420

[45] Date of Patent: Oct. 5, 1999

[54] TRANSMISSION CONTROL SYSTEMS WITH SHIFT DETERMINATION BASED ON PEDAL FLUCTUATIONS WITHIN LIMITS WHICH VARY WITH ENGINE SPEED

[75] Inventor: Paul Malcolm Darnell, Leamington Spa, United Kingdom

[73] Assignee: AP Kongsberg Limited, Warwickshire, United Kingdom

[21] Appl. No.: 08/973,084

[22] PCT Filed: Feb. 10, 1997

[86] PCT No.: PCT/GB97/00363

§ 371 Date: Oct. 9, 1997

§ 102(e) Date: Oct. 9, 1997

[87] PCT Pub. No.: WO97/29307

PCT Pub. Date: Aug. 14, 1997

[30] Foreign Application Priority Data

Feb. 10, 1996 [GB] United Kingdom ................. 96 02731

[51] Int. Cl.⁶ ............................. F16H 61/16; F16H 61/02
[52] U.S. Cl. .......................... 477/120; 477/905; 477/115
[58] Field of Search ............................. 477/98, 115, 110, 477/120, 905, 904; 701/55, 56, 57

[56] References Cited

U.S. PATENT DOCUMENTS

| | | | |
|---|---|---|---|
| 4,638,690 | 1/1987 | Hattori et al. ....................... | 477/115 X |
| 4,976,170 | 12/1990 | Hayashi et al. ...................... | 477/905 X |
| 4,996,893 | 3/1991 | Nakamura et al. .................. | 477/120 X |
| 5,396,420 | 3/1995 | Graf ..................................... | 477/128 X |
| 5,411,449 | 5/1995 | Takahashi et al. ................... | 477/905 X |
| 5,436,834 | 7/1995 | Graf et al. ............................ | 477/121 X |
| 5,455,767 | 10/1995 | Staerker .............................. | 477/120 X |
| 5,474,508 | 12/1995 | Kondo et al. ........................ | 477/121 X |
| 5,499,953 | 3/1996 | Hayasaki .............................. | 477/905 X |
| 5,558,600 | 9/1996 | Tsukamoto et al. .................... | 477/121 |
| 5,748,472 | 5/1998 | Gruhle et al. ........................ | 701/55 X |
| 5,846,161 | 12/1998 | Hosseini et al. ........................ | 477/115 |

FOREIGN PATENT DOCUMENTS 361943   4/1990   European Pat. Off. .

*Primary Examiner*—Khoi Q. Ta
*Attorney, Agent, or Firm*—Darby & Darby

[57] ABSTRACT

A vehicle transmission control system in which a central control unit issues signals to an associated main drive clutch actuator and to ratio actuating means to effect changes in the operative ratio of an associated transmission in accordance with a predetermined shift point map. When the shift point map indicates that a ratio shift is appropriate, the system tests for fluctuations in the position of the an associated engine accelerator pedal and only actions the shift if the degree of fluctuation of the accelerator pedal position is judged acceptable. The acceptable level of accelerator pedal fluctuation preferably varies with engine speed.

19 Claims, 5 Drawing Sheets

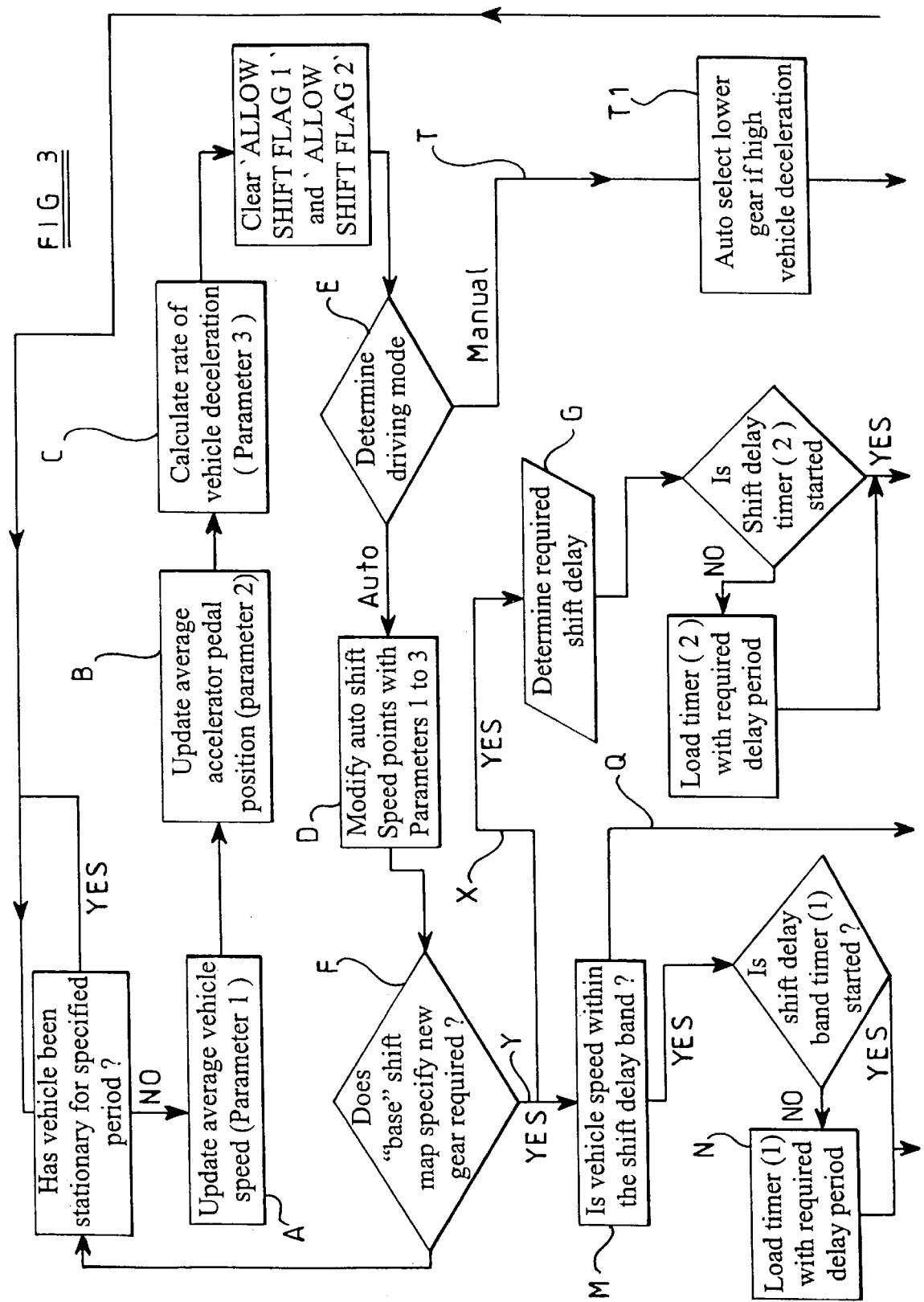

TRANSMISSION CONTROL SYSTEMS WITH SHIFT DETERMINATION BASED ON PEDAL FLUCTUATIONS WITHIN LIMITS WHICH VARY WITH ENGINE SPEED

This invention relates to vehicle transmission control systems and in particular to such systems for the control of multi ratio vehicle transmissions driven via a main drive clutch means and in which the ratios are engaged by syncromesh units (or similar clutching devices) operated by actuating means which may be fluid pressure operated. Such transmissions may be arranged to change their operative ratio automatically in response to variations in the operating conditions of the associated vehicle or may have an automatic selection mode as well as a manual selection mode. Examples of such transmissions are described in co-pending UK Patent Application Nos 95 05174.4, 95 05176.9 and 95 07462.1.

It is an object of the present invention to provide an improved form of vehicle transmission control system which automatically adapts to the style of the current vehicle driver and prevailing road conditions and environment.

Thus according to the present invention there is provided a vehicle transmission control system in which a central control unit issues signals to an associated main drive clutch actuator means and to ratio actuating means to effect changes in the operative ratio of an associated transmission in accordance with a predetermined shift point map, the system being characterised in that, when the shift point map indicates that a ratio shift is appropriate, the system tests for fluctuations in the position of an associated engine accelerator pedal and only actions the shift if the degree of fluctuation of the accelerator pedal position is judged acceptable.

The shift may only be actioned if the fluctuation in accelerator position does not exceed a predetermined level within a predetermined time period.

The acceptable level of fluctuation in accelerator position may vary with engine speed. The time period may also vary with engine speed. For example, the acceptable level of fluctuations in accelerator position preferably increases and the time period decreases with increasing engine speed and vice versa.

The acceptable level of fluctuation in accelerator pedal position is preferably defined as a range of angular movement of the accelerator pedal which increases with engine speed.

In an alternative form of the invention the shift is only actioned if the rate of movement of the accelerator pedal is less than a predetermined rate.

The control system preferably also includes the additional control that when a particular shift point is reached on the shift map a vehicle speed band is entered, within which the vehicle speed must remain for a predetermined period of time, or which must be exceeded, before the appropriate shift is actioned.

The vehicle speed band preferably varies with accelerator pedal position.

The shift point map may be modified during a given journey dependent on one or more of the following parameters:
 i) average vehicle speed;
 ii) vehicle deceleration level and/or application of associated vehicle brakes;
 iii) driver's current driving style and/or road conditions, and
 iv) average accelerator pedal position or average rate of change of accelerator pedal position If the average vehicle speed during a journey is high the control means may reduce the time taken to shift between operative ratios and vice versa.

One embodiment of the present invention will now be described, by way of example only, with reference to the accompanying drawings in which.

Figure 1:
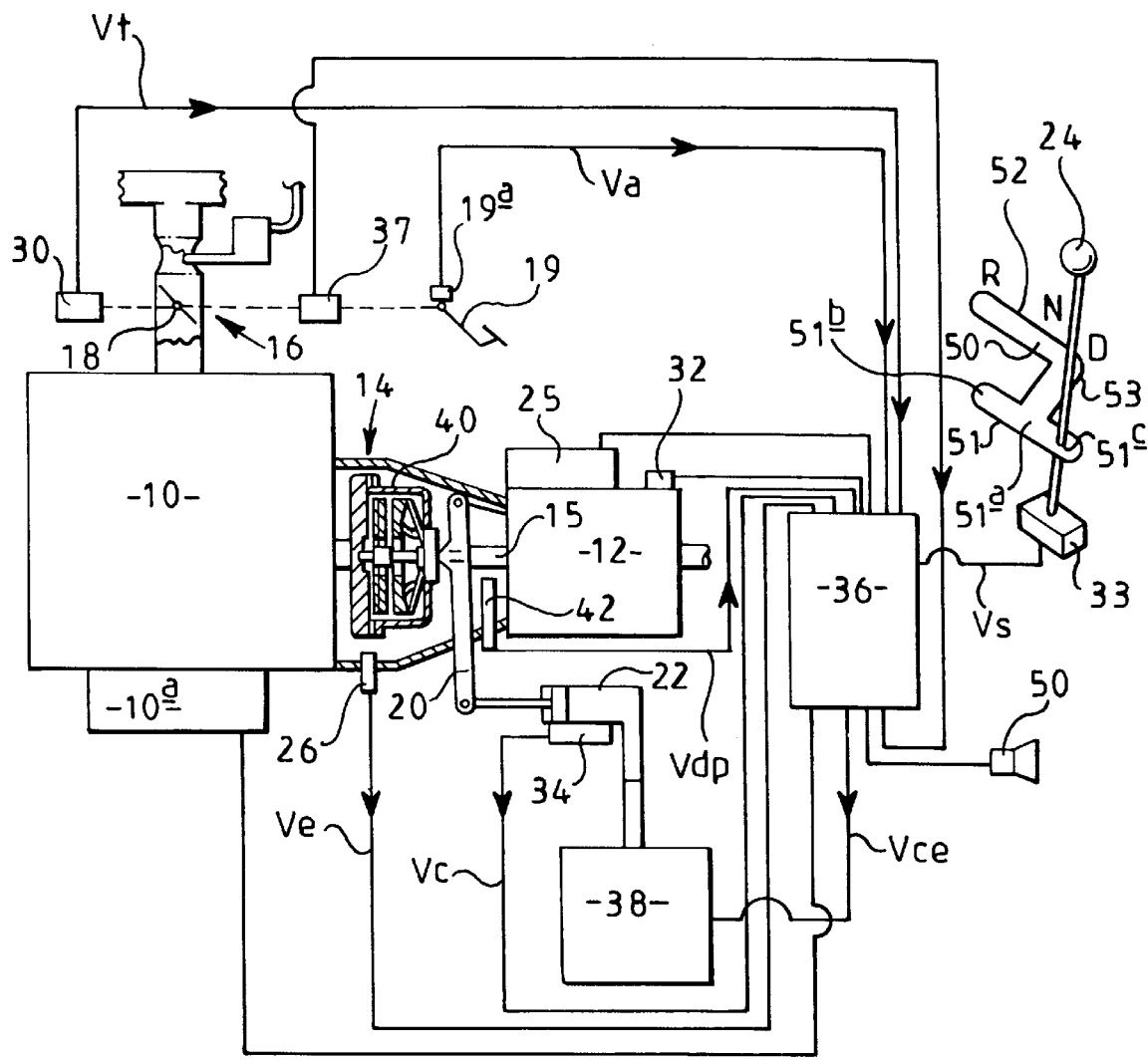
FIG. 1 shows diagramatically a vehicle transmission control system with a control unit which operates in accordance with the present invention.

Referring to FIG. 1 this shows an engine 10 with a starter and an associated starter circuit 10$a$ which is coupled through a main drive friction clutch 14 with a five speed synchronised lay-shaft type gearbox 12 via a gearbox input shaft 15. In the example described, fuel is supplied to the engine by a throttle 16 which includes a throttle valve 18 operated by accelerator pedal 19. The invention is equally applicable to electronic or mechanical fuel injected petrol or diesel engines.

The clutch 14 is actuated by a release fork 20 which is operated by a main drive clutch actuator in the form of a slave cylinder 22.

The selection of the operative ratio of the gearbox may be controlled manually or automatically.

A gear selector lever 24 operates in a gate 50 having two limbs 51 and 52 joined by a cross track 53. When the lever 24 is in limb 51 the transmission operates in manual mode and the lever 24 is biassed to return to a central position 51$a$ when released. Each movement of lever 24 from central position 51$a$ to a downchange position 51$b$ selects a downchange of one ratio in the currently operative ratio of the gearbox and each movement to an upchange position 51$c$ selects an upchange of one ratio.

The position of lever 24 in limb 51 and 52 is sensed by a series of sensors (eg micro switches and optical sensors spaced around the gate) which are indicated collectively at 33 and whose signal outputs Vs are fed to control unit 36.

Control unit 36 in turn issues signals to a gear engaging mechanism 25 which includes, for example, hydraulic rams and solenoid control valves to move selector members to engage the desired gearbox ratio. One example of a suitable gear engaging mechanism is disclosed and claimed in the Applicants earlier co-pending UK Patent Application No. 952140.8.

The limb 52 of gate 50 has three positions; an 'R' position in which the lever is placed to select reverse;, an. 'N' position to select neutral, and a 'D' position in which the lever is placed when it is desired that the forward drive ratio of the gearbox should be selected automatically by control unit 36 in accordance with the current operating conditions of the vehicle.

When in the 'D' position the control unit 36 determines which ratio is most appropriate for the current vehicle operating conditions and issues appropriate ratio selection signals to gear engaging mechanism 25.

To determine the appropriate operating ratio control unit 36 receives signals from a plurality of vehicle operating parameter sensors such as signals Ve proportional to engine speed from engine speed sensor 26. Signals Vt are received from throttle valve position sensor 30 proportional to the current throttle opening and/or accelerator pedal position signals Va from an accelerator position sensor 19a are also fed to control unit 36. Control unit 36 also receives a gear signal Vg from gear position sensor 32 which corresponds to the gear ratio currently engaged, signals Vc from slave cylinder position sensor 34, which varying with the position of the slave cylinder 22, and signals Vdp proportional to clutch driven plate speed from speed sensor 42 which actually senses the speed of the gearbox shaft 15 (which is equal to that of a driven plate 40 of the clutch 14). Since the speed of the vehicle depends on the driven plate speed and the gear engaged, the driven plate speed sensor 42 acts in effect as a vehicle speed sensor and vice versa. Thus in some applications no driven plate speed sensor 42 is provided and this speed is calculated from the gearbox ratio and the vehicle speed which is given by a vehicle speed sensor (not shown) of, for example, the variable reluctance type.

A buzzer 50 is connected with control unit 36 to warn/indicate to the vehicle operator when certain vehicle operating conditions occur. In addition to or in place of buzzer 50 a flashing warning light or other visual display (not shown) may be used.

Figure 2:
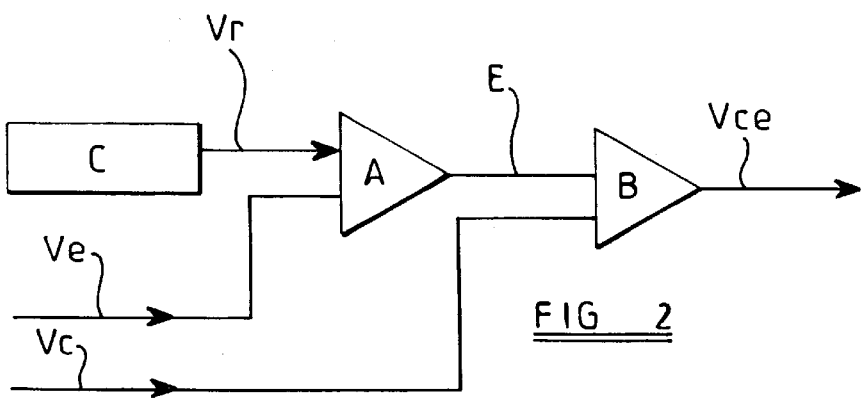
FIG. 2 shows diagrammatically the generation of a clutch engagement control signal used in the system of FIG. 1.

As indicated above control unit 36 also controls the engagement and disengagement of the clutch 14. This is done by the control unit 36 generating a reference signal Vr in a generator C (see FIG. 2) which is representative of a desired engine speed. This reference signal is compared in comparator A with the actual engine speed signal Ve from engine speed sensor 26 to produce an error signal E which is compared in comparator B with the clutch actuator position signal Vc from sensor 34 to provide a clutch engagement control signal Vce which the control unit 36 outputs to the hydraulic control 38. Operation of a control unit 36 in this general manner is described in more detail, for example in the Applicants earlier European Patents 0038113 and 0043660. In addition to controlling the engagement and disengagement of clutch 14 the control unit 36 also controls the throttle setting via a throttle control 37 when its control logic indicates that an override of the throttle opening set by the driver's operation of the accelerator 19 is desirable. In some applications the throttle control 37 may be omitted and replaced by ignition and fuel control.

In accordance with the present invention, the operative ratio of the transmission is controlled by a pre-determined standard shift point map (see FIG. 4) which lays down the vehicle speed and accelerator position at which the operative ratios are changed during upshifting and downshifting.

Figure 4:
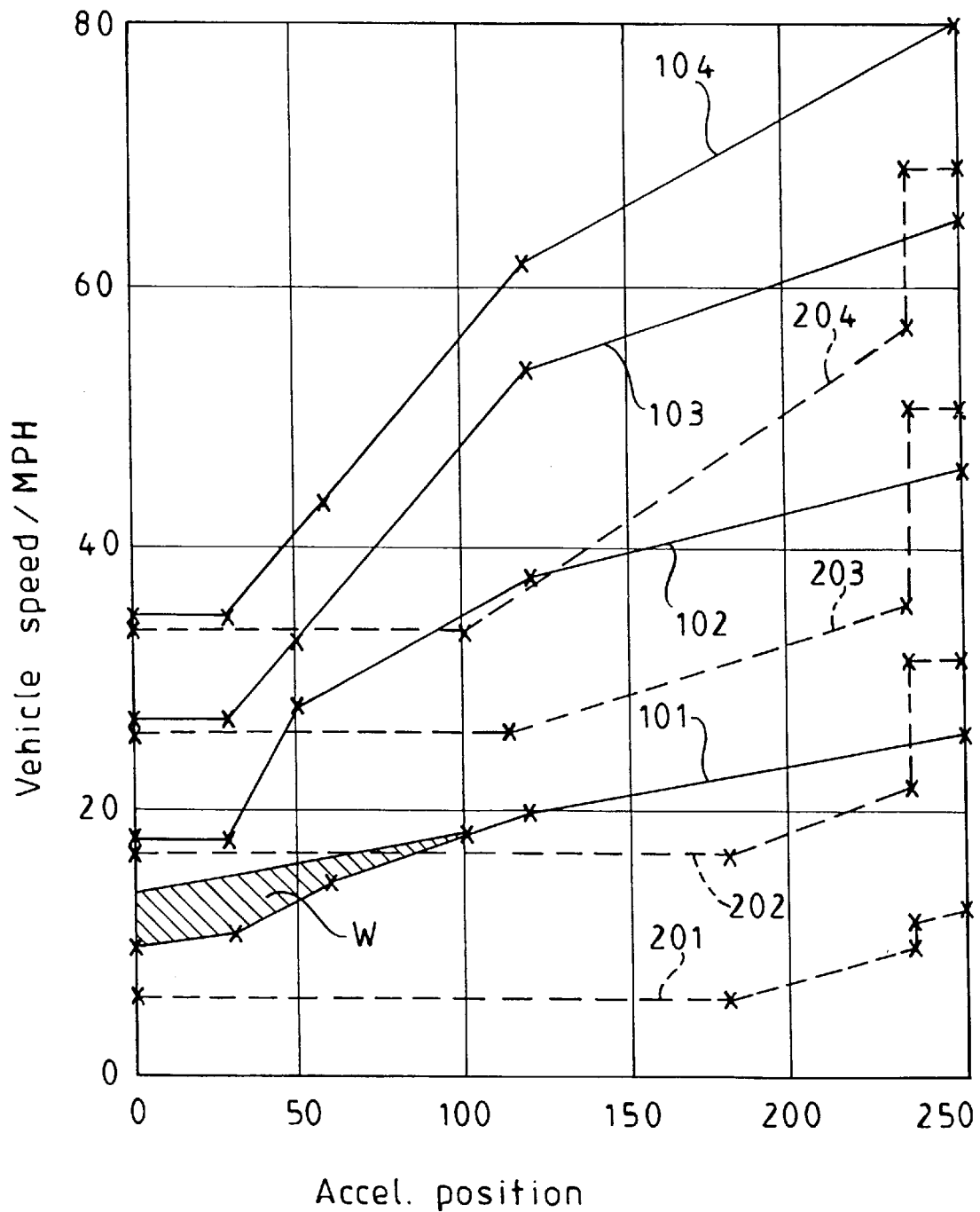
FIG. 4 shows a typical standard shift point map.

FIG. 4 shows an example of a typical shift point map in which solid lines 101, 102, 103 and 104 defines the points at which upshifts between first and second; second and third; third and fourth; and fourth and fifth gear ratios are made and dotted lines 204, 203, 202 and 201 define the points at which downshifts between fifth and fourth; fourth and third; third and second; and second and first gear ratios are made. It is relative to this standard shift point map that the control system of the present invention actions ratio shifts. This shift point map may also be automatically modified in accordance with variations in pre-determined operating parameters of the associated transmission and/or vehicle.

Figure 3A:
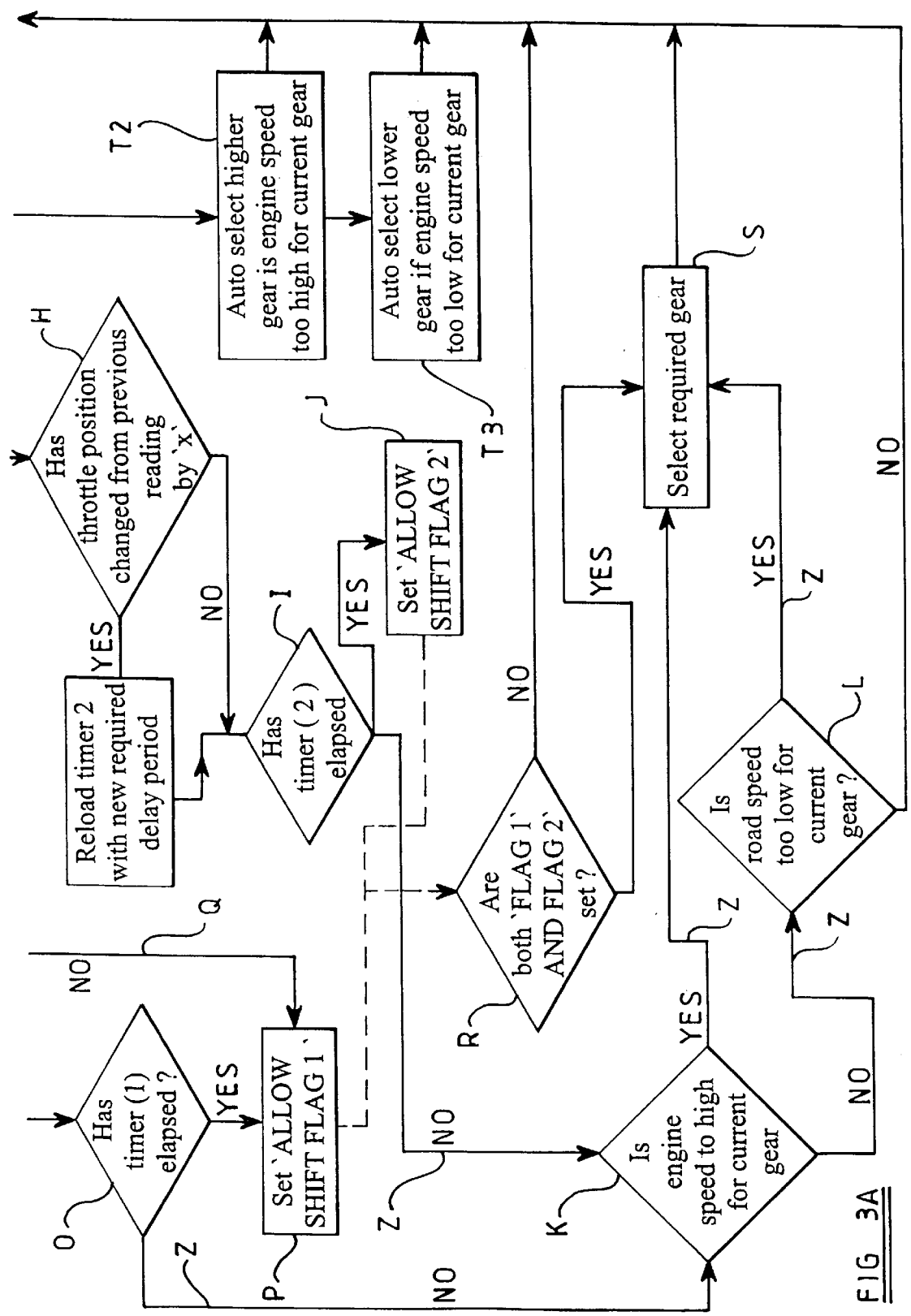
FIG. 3 is a flow diagram of the decision process employed in the control system of the present invention.

FIG. 3 shows the flow diagram of the decision process employed in the control unit 36 of the control system of the present invention.

The shift point map may be varied during a particular journey in dependence on three main parameters which are computed in boxes A, B and C. Box A represents the computation of average vehicle speed on the journey, Box B average accelerator pedal position and Box C rate of vehicle deceleration. Any given system may utilise one or more of boxes A, B and C as a shift point map control parameter.

For example, if during a given journey average vehicle speed from box A is high, downshifting and upshifting speeds are increased and vice versa (see box D of FIG. 3).

Also, if the average accelerator position is high (see box B), downshifting and upshifting speeds are increased and vice versa per box D.

Downshifting speed is also increased if vehicle deceleration is high and/or the vehicle brakes are applied (see box C).

Typically the control system is set-up so that the vehicle operator selects manual or automatic mode of operation by operating an appropriate control represented by box E in FIG. 3.

When in the automatic mode the control system is also set up so that once the vehicle speed reaches the speed required for a gear shift to occur (see box F) two parallel control strategies apply represented by branches X and Y of FIG. 3.

Figure 5:
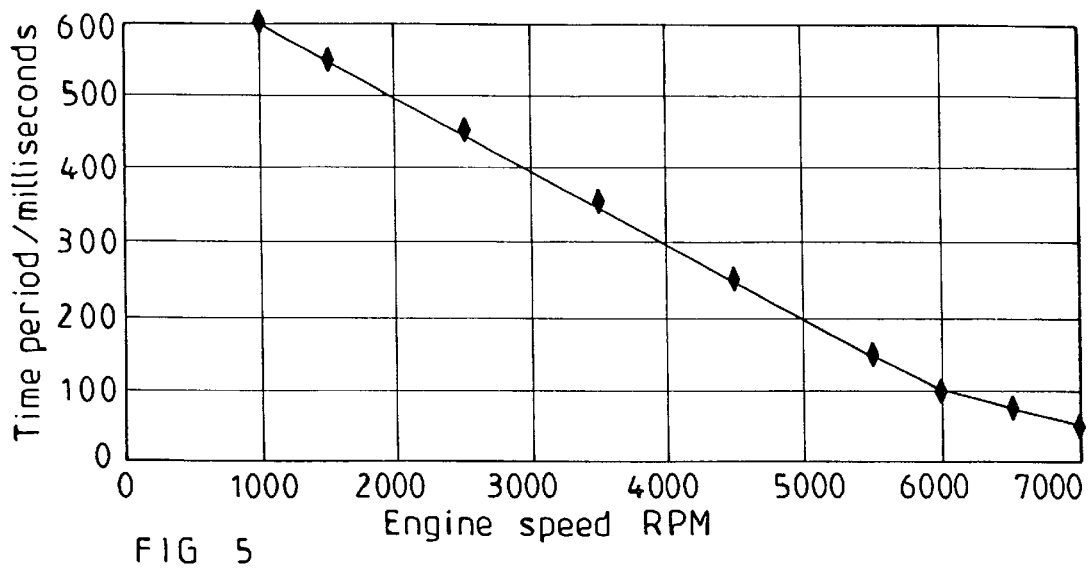
FIGS. 5 and 6 show graphically the typical variation of the parameters "time period" and "fluctuation level" with engine speed used in the control system of the present invention.
Figure 6:
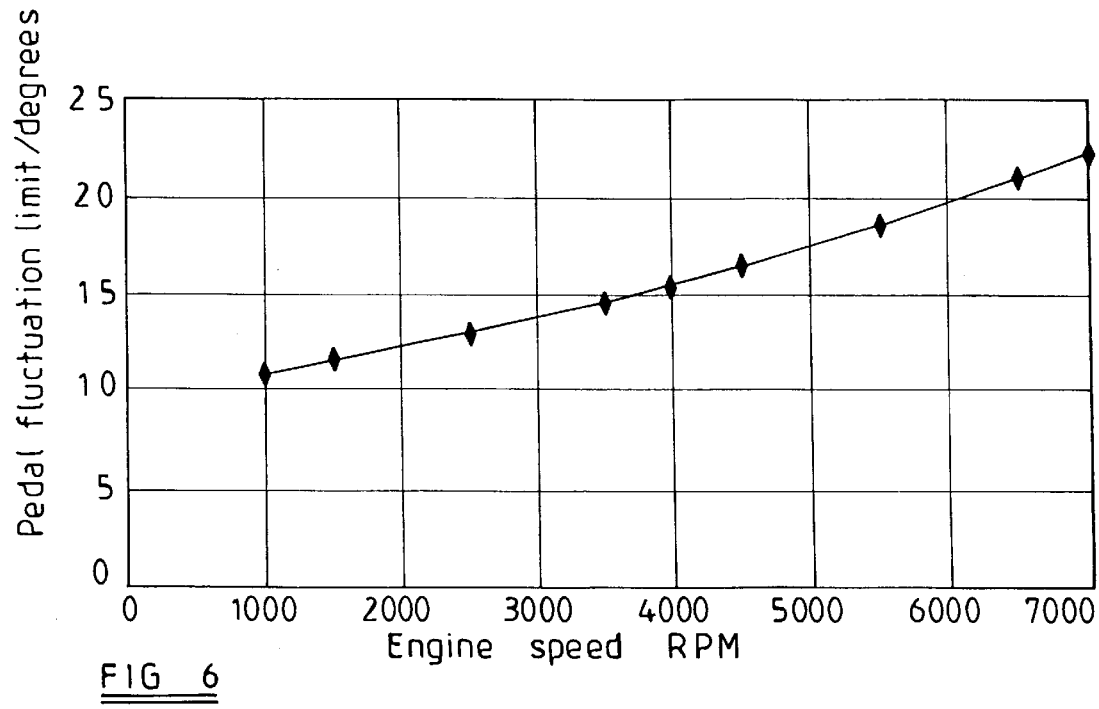

In branch X the system tests for fluctuations in the position of the accelerator pedal 19 and sets the ALLOW SHIFT FLAG 2 if the degree of fluctuation is judged acceptable. This pedal position fluctuation test comprises two elements. Firstly, the time period over which the test is conducted (see box G) is determined, this time period decreasing with engine speed as can be seen from FIG. 5. Secondly, the level of pedal position fluctuation acceptable is determined (see box H). This level increases with engine speed as can be seen from FIG. 6 and is typically defined as a ± range of angular movement of the accelerator pedal position.

Thus if the acceptable level of pedal position fluctuation has not been exceeded (box H) within the specified time period (set in box G and tested in box I) the ALLOW SHIFT FLAG 2 is set as per box J.

The system also continues to monitor via loops Z if the current engine speed is too high (box K) or too low (box L) for the current transmission ratio engaged and changes ratio appropriately as necessary in box S.

There are several benefits to be gained from the above accelerator pedal fluctuation test for example:

a) If the vehicle speed is above that at which a gear shift will occur, the gear shift will be delayed until the operator is maintaining a "relatively" steady throttle position. If the operator has a high throttle position, but the throttle position is reducing, the system will "wait" before completing the upshift. This has the benefit of determining whether the operator is intending to fully close the throttle (thus intending to slow down), in which case an upshift would be unwanted by the operator. This prevents the upshift occurring, which would have been following in close succession by a downshift.

b) Likewise, if the vehicle speed is above that at which a gear shift will occur, and the operator has a low throttle position, but the throttle position is increasing, the system will withhold completing an upshift since it is assumed that the operator is intending to accelerate. This will generate improved acceleration, and eliminate the delay in acceleration that would have occurred due to the completion of the gearshift.

c) Withholding the upshift is particularly beneficial in a kick down situation where there is a risk of an upshift being quickly followed by a downshift as the operator fully depresses the throttle.

d) Inhibiting upshifts also ensures that if the operator is removing his foot from the accelerator pedal (thus intending to slow down), but with the vehicle speed above upshift speed, a higher level of engine braking is available.

In parallel branch Y the system applies a shift delay band by ensuring that when a particular shift point is reached a vehicle speed delay band is entered (box M). Shaded band W in FIG. 4 is the speed delay band entered when changing from the first to the second gear ratios and within which the vehicle speed must remain for a predetermined time period (which is set in box N) if the ALLOW SHIFT FLAG 1 is to be set in box P. This condition is tested for in box O. Alternatively if vehicle speed exceeds the speed delay band W during the time period set by box N the ALLOW SHIFT FLAG 1 is set at box P via loop Q.

Similar delay bands (not shown in FIG. 4) are applied to each up or down ratio change.

As can be seen from FIG. 4, the width of band W decreases with increasing accelerator position. Both the width of the delay band W (set in box M) and the time period within which the vehicle speed must remain in the band (set in box N) are varied in accordance with one or more of the parameters (average vehicle speed, average accelerator pedal position and rate of vehicle deceleration) computed in boxes A, B and C.

Provision of the above delay band has the benefit of reducing the number of gear shifts, especially during town driving.

When both ALLOW SHIFT FLAGS 1 and 2 are set (tested in box R) the shift can be actioned (see box S).

In the flow diagram shown, the control system also includes a manual operation mode (branch T) in which the system can be arranged to have a degree of override of the ratio manually selected by the operator if that selection is not deemed appropriate. For example, at box T1 the control system can be arranged to change down to a lower ratio if vehicle deceleration is high, at box T2 a change up to a higher ratio is selected if engine speed is too high for the current ratio, and at box T3 a change down to a lower ratio is selected if engine speed is too low for the current ratio.

The control system can also be arranged to reduce the time taken to shift between the operative ratios of the transmission if either average vehicle speed, vehicle deceleration level, average accelerator pedal position or average rate of change of accelerator pedal position is high during a given journey or some other parameter indicates that the operator is driving the vehicle in a more sporting manner. Conversely the time taken to shift between operative ratios may be increased if the operator is adapting a more leisurely driving style.

The adjustment of the time to shift between ratios (via higher synchronisation force, higher actuation speed, quicker torque reduction and clutch disengagement) enables quicker shifts at high engine/road speed, when the driver would demand a "short gear shift time", and relatively long shifts at low vehicle speed, low acceleration etc. This increases the effective durability of the system, without compromising apparent gear shift time to the operator.

It will be appreciated that a transmission control system which operates in accordance with the present invention, as described above, automatically adapts the shift points of the associated transmission in accordance with the vehicle drivers current driving style, prevailing road conditions and environment and is particularly efficient at preventing unnecessary ratio changes.

Although the invention has been described above in relation to use with standard multi-ratio lay-shaft type gearbox 12 it is also applicable to use with other multi-ratio gearboxes such as the so-called "twin-clutch" type of gearbox shown in, for example, GB-A-2064028 in which the operative ratio is pre-selected by synchromesh units and drive is engaged by the overall operation of one of two main drive clutches.

I claim:

1. A vehicle transmission control system in which a central control unit (36) issues signals to an associated main drive clutch actuator means (22, 38) and to ratio actuating means (25) to effect changes in the operative ratio of an associated transmission (12) in accordance with a predetermined shift point map, the system being characterised in that, when the shift point map indicates that a ratio shift is appropriate, the system tests for fluctuations in the position of an associated engine accelerator pedal (19) and only actions the shift if fluctuations in the position of the accelerator pedal are within predetermined limits, said predetermined limits varying with engine speed.

2. A control system according to claim 1 characterised in that the shift is only actioned if the fluctuation in accelerator position does not exceed a predetermined level within a predetermined time period.

3. A control system according to claim 2 characterised in that the acceptable predetermined level of fluctuation in accelerator position varies with engine speed.

4. A control system according to claim 2 characterised in that the time period varies with engine speed.

5. A control system according to claim 2 characterised in that the acceptable predetermined level of fluctuation in accelerator position increases and the time period decreases with increasing engine speed.

6. A control system according to claim 1 characterised in that the shift is only actioned if the rate of movement of the accelerator pedal (19) is less than a predetermined rate.

7. A control system according to claim 6 characterised in that the predetermined rate varies with engine speed.

8. A control system according to claims 2, 3, 5 or 7 characterised in that the acceptable level of fluctuation in accelerator pedal position is defined as a range of angular movement of the accelerator pedal (19) which increases with engine speed.

9. A control system according to claim 1 characterised in that when a particular shift point is reached on the shift map a vehicle speed band is entered, within which the vehicle speed must remain for a predetermined period of time, or which must be exceeded, before the appropriate shift is actioned.

10. A control system according to claim 9 characterised in that the vehicle speed band varies with accelerator pedal position.

11. A control system according to claim 1 characterised in that the shift point map is modified during a given journey dependent on one or more of the following parameters:
 i) average vehicle speed;
 ii) vehicle deceleration level or application of associated vehicle brakes; and
 iii) average accelerator pedal position or average rate of change of accelerator pedal position.

12. A control system according to claim 11 characterised in that if average vehicle speed is high then downshifting and upshifting speeds are increased.

13. A control system according to claim 11 characterised in that the down shifting speeds are increased if vehicle deceleration is high.

14. A control system according to claim 11 characterised in that if during a given journey average engine accelerator pedal position is high or average rate of change of accelerator pedal position is high the downshifting and upshifting speeds are increased.

15. A control system according to claim 1 charactersided in that if during a given journey either average vehicle speed, vehicle deceleration level, average accelerator pedal position or average rate of change of accelerator pedal position is high the control means reduces the time taken to shift between operative ratios and vice versa.

16. A control system according to claim 1 characterised in that if during a given journey either average vehicle speed, vehicle deceleration level, average accelerator pedal position or average rate of change of accelerator pedal position is low the control means increases the time taken to shift between operative rations.

17. A control system according to claim 2 characterised in that the acceptable predetermined level of fluctuation in accelerator position decreases and the time period increases with increasing engine speed.

18. A control system according to claim 11 characterised in that if average vehicle speed is low then downshifting and upshifting speeds are decreased.

19. A control system according to claim 11 characterised in that if during a given journey average engine accelerator pedal position is low or average rate of change of accelerator pedal position is low the downshifting and upshifting speeds are decreased.

* * * * *